United States Patent
Kober et al.

(10) Patent No.: US 11,850,962 B2
(45) Date of Patent: Dec. 26, 2023

(54) SYSTEM AND A METHOD FOR DETERMINING A RELATIVE POSE BETWEEN A PRIMARY WINDING STRUCTURE AND A SECONDARY WINDING STRUCTURE OF A SYSTEM FOR INDUCTIVE POWER TRANSFER

(71) Applicant: Bombardier Primove GmbH, Berlin (DE)

(72) Inventors: Werner Kober, Ilz (AT); Sotirios Sotiriou, Mannheim (DE)

(73) Assignee: Bombardier Primove GmbH, Berlin (DE)

( * ) Notice: Subject to any disclaimer, the term of this patent is extended or adjusted under 35 U.S.C. 154(b) by 551 days.

(21) Appl. No.: 16/754,478

(22) PCT Filed: Oct. 5, 2018

(86) PCT No.: PCT/EP2018/077092
§ 371 (c)(1),
(2) Date: Apr. 8, 2020

(87) PCT Pub. No.: WO2019/072699
PCT Pub. Date: Apr. 18, 2019

(65) Prior Publication Data
US 2020/0339001 A1    Oct. 29, 2020

(30) Foreign Application Priority Data
Oct. 9, 2017  (GB) ..................................... 1716513

(51) Int. Cl.
*B60L 53/35* (2019.01)
*B60L 53/36* (2019.01)
(Continued)

(52) U.S. Cl.
CPC ............... *B60L 53/36* (2019.02); *B60L 53/12* (2019.02); *B60L 53/305* (2019.02); *B60L 53/38* (2019.02);
(Continued)

(58) Field of Classification Search
CPC ....................................................... B60L 53/38
(Continued)

(56) References Cited

U.S. PATENT DOCUMENTS

| 2014/0035565 A1 | 2/2014 | Enthaler et al. |
| 2015/0175025 A1 | 6/2015 | Barbul et al. |

(Continued)

FOREIGN PATENT DOCUMENTS

| CN | 103580102 A | 2/2014 |
| CN | 105026204 A | 11/2015 |

(Continued)

*Primary Examiner* — Edward Tso
*Assistant Examiner* — Ahmed H Omar
(74) *Attorney, Agent, or Firm* — The Webb Law Firm

(57) ABSTRACT

A system for determining a relative pose between a primary winding structure and a secondary winding structure of a system for inductive power transfer. The system includes at least a first pose determining means for determining a relative pose, wherein the relative pose is determinable by the first pose determining means. The system further includes at least one correcting means for correcting the pose determination by the first pose determining means. A correction of the pose determination is adjustable.

20 Claims, 3 Drawing Sheets

(51) Int. Cl.
*H02J 50/80* (2016.01)
*H02J 50/90* (2016.01)
*H02J 50/10* (2016.01)
*H02J 50/60* (2016.01)
*B60L 53/12* (2019.01)
*B60L 53/30* (2019.01)
*B60L 53/38* (2019.01)
*G01B 21/00* (2006.01)
*B60L 53/124* (2019.01)
*H02J 7/00* (2006.01)

(52) U.S. Cl.
CPC .............. *G01B 21/00* (2013.01); *H02J 50/10* (2016.02); *H02J 50/60* (2016.02); *H02J 50/80* (2016.02); *H02J 50/90* (2016.02); *B60L 53/124* (2019.02); *H02J 7/00034* (2020.01); *H02J 2310/48* (2020.01)

(58) Field of Classification Search
USPC ........................................................ 320/104
See application file for complete search history.

(56) References Cited

U.S. PATENT DOCUMENTS

| | | | |
|---|---|---|---|
| 2016/0031413 A1 | 2/2016 | Carlsson et al. | |
| 2016/0059723 A1 | 3/2016 | Kim et al. | |
| 2016/0318413 A1 | 11/2016 | Roehrl et al. | |
| 2016/0347187 A1 | 12/2016 | Wierse et al. | |
| 2017/0005523 A1* | 1/2017 | Widmer | B60L 53/38 |
| 2017/0021734 A1 | 1/2017 | Birkholz et al. | |
| 2017/0033616 A1 | 2/2017 | Ludwig et al. | |
| 2017/0151883 A1* | 6/2017 | Bae | B60L 53/37 |
| 2017/0225582 A1 | 8/2017 | Augst et al. | |
| 2018/0083349 A1* | 3/2018 | Sieber | H02J 50/60 |
| 2018/0141450 A1* | 5/2018 | Oh | G01S 17/06 |
| 2018/0208072 A1 | 7/2018 | Lannoije et al. | |
| 2018/0287416 A1* | 10/2018 | Saita | H02J 7/0027 |
| 2018/0312071 A1* | 11/2018 | Long | B60L 53/39 |
| 2018/0354528 A1 | 12/2018 | Krammer | B60W 50/12 |
| 2019/0111842 A1* | 4/2019 | Batur | B60L 53/37 |
| 2019/0118657 A1* | 4/2019 | Wang | B60L 53/39 |
| 2019/0393728 A1* | 12/2019 | Huang | H04B 5/0037 |

FOREIGN PATENT DOCUMENTS

| | | |
|---|---|---|
| CN | 105391183 A | 3/2016 |
| CN | 106464034 A | 2/2017 |
| CN | 107078557 A | 8/2017 |
| CN | 107107770 A | 8/2017 |
| CN | 107107773 A | 8/2017 |
| DE | 102014206739 A1 | 10/2015 |
| DE | 102014014859 A1 | 4/2016 |
| DE | 102015210314 A1 | 12/2016 |
| GB | 2522852 A | 8/2015 |
| GB | 2542182 A | 3/2017 |
| WO | 2014023651 A1 | 2/2014 |
| WO | 2016193259 A1 | 12/2016 |
| WO | 2016207290 A1 | 12/2016 |

* cited by examiner

SYSTEM AND A METHOD FOR DETERMINING A RELATIVE POSE BETWEEN A PRIMARY WINDING STRUCTURE AND A SECONDARY WINDING STRUCTURE OF A SYSTEM FOR INDUCTIVE POWER TRANSFER

CROSS-REFERENCE TO RELATED APPLICATIONS

This application is the United States national phase of International Application No. PCT/EP2018/077092 filed Oct. 5, 2018, and claims priority to United Kingdom Patent Application No. 1716513.5 filed Oct. 9, 2017, the disclosures of which are hereby incorporated by reference in their entirety.

A system and a method for determining a relative pose between a primary winding structure and a secondary winding structure of a system for inductive power transfer.

BACKGROUND OF THE INVENTION

Field of the Invention

The invention relates to a system and a method for determining a relative pose between a primary winding structure and a secondary winding structure of a system for inductive power transfer.

Description of the Related Art

The document GB 2542182 A discloses a system for determining a relative position and orientation between a primary and a secondary winding structure of a system for inductive power transfer, in particular to a vehicle.

It is desirable to position the vehicle in a so called charging pose (charging position and/or orientation), wherein a desired, e.g. maximized, amount of power can be transferred, in particular with the best possible efficiency. In order to position the vehicle in such a charging pose, it is desirable to provide information on an actual relative pose to the driver of the vehicle, e.g. by displaying such information on a vehicle-sided display. In particular during the final phase of the vehicle approach towards charging unit, it is usually not possible for the driver to visually determine said relative pose.

It is possible that changing environmental influences affect the relative pose determination in an undesired way, e.g. because an accuracy is decreased. Thus, a result of the relative pose determination can change due to changing environmental influences although the real relative pose doesn't change. The method described in GB 2542182 A, for example, relies on the evaluation of transmitted signals. These signals can e.g. disturbed by environmental influences such as metal objects or ferromagnetic material such as ferro-concrete and other kind of influences. Further, said influences may change over lifetime of the system for inductive power transfer.

There is the technical problem to provide a system and a method for determining a relative pose between a primary and a secondary winding structure of an inductive power transfer system, wherein inaccuracies in the relative pose determination due to environmental influences are minimized, in particular if said environmental influences change over lifetime of the system, e.g. between successive approaches of a vehicle towards the charging unit.

SUMMARY OF THE INVENTION

In some embodiments or aspects, the present disclosure provides for a correction of a relative pose determination, wherein the correction is adjustable, in particular over the lifetime or of a runtime of the system.

It is a main idea of the invention to provide a correction of a relative pose determination, wherein the correction is adjustable, in particular over the lifetime or of a runtime of the system.

A system for determining a relative pose between a primary winding structure and a secondary winding structure of a system for inductive power transfer, in particular to a vehicle, is proposed. The system for inductive power transfer can comprise a primary unit with the primary winding structure and a secondary unit with the secondary winding structure. The vehicle can comprise the secondary unit with the secondary winding structure for receiving an alternating electromagnetic field which is generated by the primary winding structure of the primary unit. The primary winding structure generates the alternating electromagnetic field if the primary winding structure is energized or supplied with operating current. The primary unit can comprise a totality or a subset of components by which an alternating electromagnetic field for inductive power transfer is generated. Correspondingly, the secondary unit can comprise a totality or a subset of components by which the alternating electromagnetic field for inductive power transfer is received and a corresponding output voltage is provided.

The primary unit can be provided by an inductive power transfer pad. An inductive power transfer pad can be installed on the surface of a route or a parking space or it can be integrated within such a surface.

The present invention can be applied in particular to the field of inductive energy transfer to any land vehicle, for example track bound vehicles, such as rail vehicles (e.g. trams). In particular, the invention relates to the field of inductive energy transfer to road automobiles mobiles, such as individual (private) passenger cars or public transport vehicles (e.g. busses).

In the following, reference can be made to a primary-sided coordinate system and a secondary-sided coordinate system. The primary-sided coordinate system can be a coordinate system of the primary winding structure, wherein the secondary-sided coordinate system can be a coordinate system of the secondary winding structure.

The primary-sided coordinate system can comprise a first axis, which can also be referred to as longitudinal axis, wherein the first axis can be a longitudinal axis of the primary winding structure or extend parallel to that axis. A second axis, which can also be referred to as lateral axis, can be a lateral axis of the primary winding structure or extend parallel to that axis. A third axis, which can also be referred to as a vertical axis, can be oriented perpendicular to the first and the second axes. The third axis can be oriented parallel to a desired direction of power transfer, i.e. from the primary unit to the secondary unit. The vertical axis can be oriented from bottom to top if pointing from the primary unit to the secondary unit.

The secondary-sided coordinate system can also comprise a first axis, which can be referred to as longitudinal axis, wherein the first axis can be a longitudinal axis of the secondary winding structure or extend parallel to that axis. A second axis of the secondary winding structure can be referred to as lateral axis, wherein the second axis can be a lateral axis of the secondary winding structure or can extend parallel to that axis. A third axis can be referred to as a vertical axis of the secondary winding structure and can be oriented perpendicular to the first and the second axes of the secondary winding structures. The third axis of the secondary winding structure can be oriented parallel to the desired direction of power transfer.

In the following, a length can be measured along the first axis, a width can be measured along the second axis and a height can be measured along the third axis. Directional terms referring to a direction such as "above", "under", "ahead", "beside" can relate to the aforementioned longitudinal, lateral and vertical axes of the respective coordinate system.

An origin of the primary-sided coordinate system can correspond to a geometric center of the primary winding structure. Correspondingly, an origin of the secondary-sided coordinate system can correspond to a geometric center of the secondary winding structure.

The primary and/or secondary winding structure can comprise at least one subwinding structure. A subwinding structure can be provided by at least one section of the winding structure. In particular, a subwinding structure can provide a loop or a coil, wherein the loop or coil is provided by one or multiple sections of the winding structure. The winding structure can extend along the longitudinal axis of the corresponding coordinate system. Preferably, a winding structure comprises multiple subwinding structures which extend along the longitudinal axis. In this case, successive subwinding structures of the winding structure can be arranged adjacent to one another along said longitudinal axis. Adjacent to each other can mean that central axes of the subwindings, in particular the axes of symmetry, are spaced apart from another, e.g. with a predetermined distance along the longitudinal axis. A loop or coil can be circular-shaped, oval-shaped or rectangular-shaped.

It is possible that the winding structure comprises at least one winding section which extends along the longitudinal axis and at least one winding section which extends along the lateral axis of the corresponding coordinate system. The winding structure, in particular each subwinding structure, can thus be provided by sections extending substantially or completely parallel to the longitudinal axis and sections extending substantially or completely parallel to the lateral axis. In particular, each subwinding can be provided by two sections extending substantially or completely parallel to the longitudinal and two sections extending substantially or completely parallel to the lateral axis.

The system comprises at least a first pose determining means for determining a relative pose between the primary winding structure and the secondary winding structure. A relative pose denotes a relative position and/or orientation.

It is e.g. possible to determine the relative pose as the position and/or orientation of the secondary winding structure in a common coordinate system. Preferably, the common coordinate system is provided by the secondary-sided coordinate system. Alternatively, however, the common coordinate system can be e.g. the primary-sided coordinate system or a coordinate system which is arranged fixed in position and fixed in orientation relative to the primary-sided coordinate system. It is, however, also possible to use another common reference coordinate system.

A relative pose can be represented by one or multiple parameters.

The system can e.g. comprise at least one evaluation unit, in particular at least one primary-sided and/or at least one secondary-sided evaluation unit. An evaluation unit can e.g. comprise or be provided by a microcontroller. In the context of this invention, the term "secondary-sided" can mean that the respective element is arranged fixed in position relative to secondary-sided coordinate system. In particular, a position of the secondary-sided element and the secondary-sided coordinate system can be known. Also, the term "secondary-sided" can mean that the respective element can be part of the secondary unit. Further, the term "primary-sided" can mean that the respective element is arranged fixed in position relative to the primary-sided coordinate system. In particular, a position and orientation of the primary-sided element in the primary-sided coordinate system is known. Also, the term "primary-sided" can mean that the respective element is part of the primary unit.

Further, the relative pose between the primary and the secondary winding structure is determinable by the first pose determining means. The first pose determining means can e.g. comprise or be provided by the system for determining a relative position and or orientation disclosed in GB 2542182 A. Thus, the disclosure of GB 2542182 A is fully incorporated by reference into the description of this invention, in particular the subject-matter of the claims.

The first relative pose determining means, however, is not restricted to the system disclosed in GB 2542182 A. In particular, any system or means which is configured to determine the relative pose between the primary and the secondary winding structure can be used as first relative pose determining means.

According to the invention, the system comprises at least one correcting means for correcting the pose determination by the first pose determining means. Further, a correction of the pose determination is adjustable, in particular over a lifetime or runtime of the proposed system. In particular, the correction of the pose determination can be adjustable during an operation of the system or between two, in particular successive, approaches of vehicle with a secondary winding structure towards the primary unit. Preferably, but not mandatorily, the correction is adjusted repeatedly.

The correction of the pose determination can be adjustable by adjusting at least one parameter used for the pose determination. The parameter can e.g. be a correction value or a parameter of a parametrised function used to determine the relative pose by the first relative pose determining means. This will be explained later.

Generally, the correction of the pose determination can be performed by determining an uncorrected relative pose in a first step, wherein the uncorrected pose is corrected in a second step, e.g. by using at least one correction value. Alternatively, the correction can be performed by adjusting at least one parameter used for the determination of the relative pose. In other words, the adjustable parameter used for the correction of the posed determination can be a parameter for the pose determination, e.g. a function-based determination, or a parameter for correcting an uncorrected pose.

The system can further comprise at least one pose trajectory determining means for determining a trajectory of the relative pose determined by the first pose determining means. Said trajectory determining means can comprise the first relative pose determining means.

A trajectory of the relative pose can denote a set of relative poses between the primary winding structure which is e.g. arranged fixed in position and the secondary winding structure which are provided along a path through space as a function of time, in particular as the vehicle moves. The trajectory determining means can e.g. comprise means for determining a change of the relative pose between successive relative poses along the path, wherein the relative poses of the set of relative poses are determined depending on the pose changes.

It is further possible that a trajectory of the secondary winding structure, in particular a pose of the secondary winding structure in a reference coordinate system or a common coordinate system, or a trajectory of the vehicle is determined depending on, e.g. as a function of, the trajectory of the relative pose. In other words, it is in particular possible to determine the pose of the secondary winding structure for multiple different points in time depending on the relative pose determined by the first relative pose determining means at these points in time. The at least one correcting means can comprise or be provided by a primary-sided and or secondary-sided computational unit, e.g. microcontroller.

Providing a correction of the pose determination which is adjustable advantageously allows to provide an improved accuracy of the pose determination over the runtime or life time of the system. If environmental influences to which the system has been adapted, e.g. by calibration, change, an adjustment of the correction can be performed in order to advantageously decrease or eliminate the effect of the environmental influence change on the pose determination result.

In another embodiment, an uncorrected pose is determinable by the first pose determining means. Further, a corrected pose is determinable using at least one pose correction value. The corrected pose can also be determined by the first pose determining means.

Further, the correction value is adjustable by the correcting means. It is also possible that the correcting means determines the at least one correction value before adjusting the correction value. In this embodiment, the at least one correction value can provide an adjustable parameter of the correction.

In this case, the uncorrected pose can e.g. be determinable by evaluating a parameterized function, wherein parameters of the function are not adjustable, e.g. fixed, in particular over a runtime or lifetime of the system.

It is e.g. possible that the at least one pose correction value is determined such that it can be added to the uncorrected pose (or to at least one parameter providing the uncorrected pose information).

The at least one pose correction value can e.g. be stored in a storage unit of the system. It is further possible that multiple pose correction values are stored in the at least one storage unit. It is possible that the proposed system comprises or provides a database, e.g. in form of a table. The database can comprise pose correction values, wherein a pose correction value can e.g. be assigned to an uncorrected relative pose or a set comprising different uncorrected poses. In other words, given an uncorrected pose, at least one pose correction value can be determined from the data base which is assigned to the given uncorrected pose or to a set of uncorrected poses comprising the given uncorrected pose.

The database, namely the stored pose correction values, can be updated, in particular repeatedly. The proposed adjustable correction of the pose determination advantageously provides an easy-to-implement system for determining the relative pose.

In an alternative embodiment, a relative pose is determinable using a parameterized pose determination function, wherein at least one parameter of the parameterized pose determination function is adjustable by the correcting means. Further, the at least one parameter can be determinable by the correcting means.

An output of the pose determination function can e.g. be the relative pose, in particular at least one value characterizing the relative pose. An input to the pose determination function can be chosen according to the selected first pose determining means. It is e.g. possible to use at least one signal characteristic of a received signal as an input to the parameterized pose determination function. Using a parameterized posed determination function with adjustable parameters advantageously allows a fast and computationally efficient determination of a pose, in particular as corrected posed can be determined from the beginning and the use of correction tables that require a lot of storage space is avoided.

In another embodiment, the system comprises a least one reference pose determining means for determining a reference relative pose. Further, the correction of the pose determination is determinable depending on the reference relative pose. In particular, the at least one pose correction value or the at least one parameter of the pose determination function is determinable depending on the reference relative pose. Moreover, the correction of the pose determination is adjustable depending on the at least one reference relative pose determined by the at least one reference pose determining means.

A reference pose determining means can be different from the first pose determining means. In particular, the first pose determining means and the reference pose determining means can allow a pose determination independent of each other. In the context of this invention, any pose determining means can be used as the reference pose determining means. Preferably, the reference pose determining means allows a pose determination which is more robust against environmental influences or the change of environmental influences than the first pose determining means. It is e.g. possible that environmental influences or a change of these influences do not affect the reference pose determination. It can be necessary to transform the relative pose determined by the first determining means and the reference pose into the common reference coordinate system.

It is in particular possible to determine the at least one pose correction value or the at least one parameter depending on a deviation between the relative pose determined by the first pose determining means and the reference relative pose. In particular, a deviation between said relative poses can be determined for multiple points in time, wherein at least one pose correction value or the at least one parameter is determinable depending on the set of multiple deviations.

It is in particular possible to determine the deviation between corresponding relative poses, e.g. between the relative pose determined by the first pose determining means and the reference pose determined by the reference pose determining means at the same point in time. It is further possible to determine the correction of pose determination, e.g. the at least one pose correction value or the at least one parameter of the pose determination function, such that the deviation or the sum of multiple deviations or any other cost function depending on the deviation (s) is minimized. The value of the cost function can be proportional to the deviation(s), e.g. to the sum of deviations.

It is further possible, in particular for the determination of the at least one pose correction value, to determine a correction value increment for the at least one pose correction value such that the aforementioned minimization is provided, wherein the correction value increment is added to an existing pose correction value. In case that multiple pose correction values are provided, e.g. by a database, a correction vector can be determined which comprises multiple correction value increments. An adjusted pose correction value can than be determined as a sum of the existing pose correction value and the corresponding correction value increment.

It is possible that the reference pose determining means cannot determine the relative pose in a desired operating range and or in all desired operating scenarios. It is e.g. possible that a scanning range, i.e. the range of relative poses which can be (reliably) determined, of the reference pose determining means is smaller than a scanning range of the first pose determining means. Alternatively or in addition, the reference pose determining means can e.g. allow the determination of a reference pose under certain operating conditions, e.g. if a transformation of the reference pose into the aforementioned common coordinate system is known. Determining the transformation can e.g. be only performed under certain operating conditions. In this case, the reference pose can only be determined after the transformation has been determined. Thus, before the transformation has been determined, the relative pose between the primary and the secondary winding structure is determined as the relative pose determined by the first pose determining means.

Using the at least one reference pose determining means therefore advantageously allows to adjust a correction of the pose determined by the first pose determining means, in particular in scenarios where determination of the reference relative pose is not possible.

In another embodiment, the at least one reference pose determining means comprises at least one secondary winding structure pose determining means, wherein the reference relative pose in determinable depending on said pose. It is in particular possible that the at least one reference pose determining means comprises at least one vehicle pose determining means, wherein the secondary winding structure pose can be determined depending on the vehicle pose. It is possible that a position and/or orientation of the secondary winding structure in the vehicle coordinate system is known. Thus, position and/or orientation of the secondary-sided—coordinate can be determined depending on the vehicle pose.

Determining the reference relative pose depending on the vehicle pose advantageously allows to use existing means for the determination of the vehicle pose, e.g. GNSS system of the vehicle or any other system for determining the vehicle pose.

In another embodiment, the system comprises at least one secondary winding structure trajectory determining means for determining a trajectory of the secondary winding structure. It is possible that the system comprises at least one vehicle trajectory determining means for determining a trajectory of the vehicle, wherein the trajectory of the secondary winding structure is determined depending on the trajectory of the vehicle.

A trajectory determining means can e.g. determine a change of the position and/or orientation between two, in particular succeeding, points in time. Thus, the secondary winding structure trajectory determining means can comprise at least one means for determining changes of the pose of the secondary winding structure.

Further, the secondary winding structure pose is determinable depending on the trajectory information. In this context, the trajectory can denote a pose or a pose change of the secondary winding structure along a path that the (moving) winding structure follows through space as function of time. It is in particular possible to determine pose changes or pose increments depending on or along the trajectory. If a spatial relationship, i.e. a coordinate transformation, for one pose of the trajectory and the aforementioned common coordinate system is known or can be determined, all poses of the secondary winding structure along the trajectory can be transformed into the common coordinate system. Using trajectory information advantageously allows to improve the reliability of determining pose changes as an additional method to determine the relative pose changes is introduced and implausible poses calculated by the first pose determining means due to local distortions coming from the environment can be identified and filtered.

In particular, the secondary winding structure pose can be determined depending on at least one dynamic parameter of the secondary winding structure. A dynamic parameter of the secondary winding structure can be a parameter which affects the dynamic behaviour of the secondary winding structure or results therefrom.

In particular, a dynamic parameter of the secondary winding structure can be a speed, a yaw rate, a longitudinal acceleration or a lateral acceleration of the secondary winding structure. Of course, other dynamic parameters can be used to determine the secondary winding structure pose. In particular, the dynamic parameters should be chosen such that the change of the pose of the secondary winding structure and/or trajectory of the secondary winding structure can reliably be determined.

In particular, the secondary winding structure pose determining means can comprise at least one sensor for measuring the at least one dynamic parameter. The sensor can e.g. be a speed sensor, a yaw rate sensor or an acceleration sensor. The sensor can be a sensor of the secondary unit, in particular a sensor integrated into the secondary unit, e.g. into a housing of the secondary unit. It is, however, also possible to use other sensors for measuring the at least one dynamic parameter, e.g. external sensors. In particular, it is possible to use non-vehicle sensors for measuring the at least one dynamic parameter.

In another embodiment, the system comprises at least one reference pose determining means for determining a reference relative pose. This has been explained before. Further, a resulting pose is determinable depending on the reference relative pose and the relative pose determined by the first pose determining means. As outlined before, it can be necessary to transform the reference relative pose and the relative pose determined by the first pose determining means into the same reference coordinate system. Further, the at least one reference pose determining means can comprise at least one secondary winding structure pose determining means as outlined before.

It is e.g. possible to fuse the at least one reference relative pose and the corresponding relative pose determined by the first pose determining means. Fusing can e.g. be performed by determining a mean value or a weighted mean value of said poses.

It is further possible to validate a reliability or functionality of the first pose determining means depending on the deviation between corresponding reference relative pose and the relative pose determined by the first pose determining means. If the deviation is e.g. higher than a predetermined threshold value, an error signal can be generated and/or an adjustment of the correction of the pose determination can be triggered. It is of course also possible to determine a set of deviations between multiple corresponding poses, e.g. along a trajectory of the vehicle, wherein a validation of the reliability or functionality of the first pose determining means is performed depending on the set of deviations.

The resulting pose can provide the relative pose between the primary winding structure and the secondary winding structure of the system for inductive power transfer. In particular, it is possible to provide said resulting pose as information to a vehicle driver, e.g. by displaying it or corresponding information on a display device of the vehicle.

In another embodiment, the secondary winding structure pose is determinable depending on at least one vehicle dynamic parameter. A vehicle parameter can be a parameter which affects the dynamic behaviour of the vehicle or results therefrom. In particular, a vehicle dynamic parameter can be a steering angle, a vehicle speed, a number of revolutions of a vehicle wheel, a yaw rate, a longitudinal acceleration or a lateral acceleration. Of course, other vehicle dynamic parameters can be used to determine the secondary winding structure pose. In particular, the vehicle dynamic parameters should be chosen such that a pose change or trajectory of the vehicle and consequently the change of the pose or trajectory of the secondary winding structure can reliably be determined by using the vehicle dynamic parameters. In particular, the secondary winding structure pose determining means can comprise at least one vehicle sensor for measuring the at least one vehicle dynamic parameter. This advantageously allows to use existing parameters for the determination of the reference pose.

It is e.g. possible to determine at least one dynamic parameter of the secondary winding structure depending on at least one vehicle dynamic parameter. For example, an acceleration and/or speed of the secondary winding structure can be equal or proportional to an acceleration and/or speed of the vehicle.

In another embodiment, the system comprises at least one secondary winding structure trajectory determining means for determining a trajectory of the secondary winding structure. This has been explained before. Further, the system comprises at least one pose trajectory determining means for determining the trajectory, i.e. the pose changes as a function of time, of the relative pose determined by the first pose determining means.

It is also possible to determine the trajectory of the secondary winding structure depending on the trajectory of the relative pose determined by the first pose determining means.

Further, a coordinate transformation of the reference relative pose and the relative pose determined by the first pose determining means into a common reference coordinate system is determined depending on the information on both trajectories. It is in particular possible that the coordinate transformation or at least one parameter of a coordinate transformation is determined such that the deviation between the trajectory of the secondary winding structure which is determined by the secondary winding structure trajectory determining means and the trajectory of the secondary winding structure which is determined depending on the trajectory of relative poses determined by the first pose determining means is minimized, wherein the deviation is determined in the common coordinate system.

This advantageously allows a simple, reliable and computationally efficient determination of the transformation.

In another embodiment, a coordinate transformation of the reference relative pose and of the relative pose determined by the first pose determining means into a common reference coordinate system is determined if a charging pose of a vehicle is detected. The coordinate transformation can e.g. be determined as a preset coordinate transformation. Alternatively, the coordinate transformation can be determined depending on the relative pose which is determined by the first or another relative pose determining means in the charging position.

A charging pose of the vehicle can e.g. be detected when the reference relative pose between the primary winding structure and the secondary winding structure is within the predefined limits, wherein the limits can be derived from an allowed charging area or volume, in particular above the primary winding structure.

It is e.g. possible that the common coordinate system is provided by the primary-sided coordinate system. In this case, relative pose determined by the first pose determining means can be used to determine the pose of the secondary winding structure in the primary sided coordinate system. Further, the reference relative pose can be determined in another coordinate system, e.g. the vehicle coordinate system or a global coordinate system. It can be assumed that in a charging pose, a pose determination is not or only minimally affected environmental influences. Hence, in such a charging pose, it is possible to determine an unaffected or only minimally affected spatial relationship between the primary winding structure and the secondary winding structure.

A charging pose can e.g. be a starting pose of the determination of the reference relative poses along the trajectory of the secondary winding structure, e.g. if the vehicle moves. As mentioned before, the reference relative pose can be determined by adding relative poses changes to such a starting pose, wherein the relative pose changes can be determined depending on trajectory information, e.g. based on the vehicle pose or vehicle pose change.

In another embodiment, the system comprised at least means for detecting a charging pose. The means for detecting the charging pose can e.g. provided by the first pose determining means. In particular, a charging pose can be detected if the relative pose determined by the first pose determining means is a preset relative pose or is a relative pose from a preset set of relative poses or does not deviate more than a predetermined amount from a preset relative pose. If a charging pose is detected, the charging pose can be set as a starting pose for the determination of the reference relative poses along a trajectory as explained before.

In another embodiment, the at least one means for detecting a charging pose is provided by a second means for determining a relative pose. The second means for determining a relative pose can be different from the first means for determining a relative pose. This can mean that at least one element of the first and the second means is different. In particular, the second means for determining a relative pose can comprise a secondary-sided transmitting unit, in particular the same secondary-sided transmitting unit as the first means for determining a relative pose. Further, the second means for determining a relative pose can comprise at least one, preferable multiple primary-sided receiving unit (s). These primary-sided receiving units can be at least partially provided by at least one winding structure of an inductive object detection system of the primary unit or the system for inductive power transfer. This advantageously allows a robust, precise and independent determination and detection of a charging pose.

In another embodiment, the system comprised communication means for a communication between a charging unit and the vehicle. The communication means can e.g. configured such that a Bluetooth™-based communication can be established. The communication means allows a data and or a signal communication between primary-sided elements and secondary-sided elements, in particular the vehicle. By means of the communication means, data encoding information on the relative pose determined by the first pose determining means and/or input signals for the first pose determining means and/or the at least one pose correction value and/or the at least one parameter of the parameterized pose determination function and/or trajectory information and/or information on the at least one reference pose and/or the at least one vehicle dynamic parameter and/or a detection of a charging pose and/or parameters of a coordinate transformation and all other kinds of information may be exchanged between the charging unit and the vehicle.

This advantageously allows to distribute elements for the determination of the relative pose over the primary-sided elements and the secondary-sided elements.

In another embodiment, the first pose determining means comprises at least one secondary-sided transmitting unit, wherein a positioning signal is transmittable by the secondary-sided transmitting unit. The positioning signal can e.g. be transmittable with a positioning frequency, e.g. a frequency of 135 kHz. Further, the first pose determining means comprises at least one primary-sided receiving unit for receiving the positioning signal. Further, a signal portion of the received signal with the positioning frequency is determinable as the positioning signal. In particular, the first pose determining means can comprise four primary-sided receiving units. Further, the relative pose is determinable depending on the determined positioning signal(s), in particular depending on at least one signal characteristic of the positioning signal. The at least one signal characteristic, e.g. an amplitude, a real portion and/or an imaginary portion of the received positioning signal can provide an input for the aforementioned parameterized pose determination function.

Further, the second means for determining a relative pose can comprise at least one primary-sided receiving unit which is at least partially provided by at least one winding structure of an inductive object detection system.

The object detection system be a system for detecting a foreign object, in particular a foreign metal object, inside and/or outside an active volume of the primary winding structure.

The object detection system can comprise inductive and capacitive elements, wherein these elements can be different from the elements of the resonant circuit of the proposed system. Such elements advantageously allow detecting a foreign object depending on a change of an inductance or capacitance of the aforementioned inductive or capacitive elements. The detection system is designed as an inductive sensing system, wherein the inductive sensing system can comprise one or multiple detection winding(s) and, if applicable, one or more excitation winding(s). Using an inductive detection system, an active or passive detection can be realized. In the case of an active detection, one or more excitation winding(s) and one or more detection winding(s) can be used. An active object detection can be performed by monitoring at least one characteristic properties of an excitation field generated by the excitation winding(s) and received by the detection winding(s). In the case of a passive detection, only one or more passive detection winding(s) are used. The passive object detection is performed by monitoring at least one characteristic of the passive winding(s), in particular an inductance.

In particular, the at least one primary-sided receiving unit can be at least partially provided by or comprise one detection winding structure. Alternatively, the at least one primary-sided receiving unit can be at least partially provided by or comprise one excitation winding structure.

Preferably, the detection winding structure can provide a receiving antenna structure of the primary-sided receiving unit. Alternatively or in addition, the primary-sided AD-converter is provided by an AD-converter of the inductive object detection system. In this case, the inductive object detection system can comprise an AD-converter in order to digitize the output signals of one or multiple detection windings.

For example, an amplitude and/or a phase value of the signal received by the at least one winding structure of the inductive object detection system or the signal portion of the received signal with the positioning frequency can be determined. Then, the relative position and/or orientation is determinable depending on the determined amplitude and/or phase value.

Determination of the relative position and/or orientation based on the signal received by the at least one winding structure of the inductive object detection system can be performed alternatively or in addition to the determination of the relative position and/or orientation based on the signal portion with the positioning frequency received by a primary-sided receiving unit. In other words, the system can comprise multiple primary-sided receiving units, wherein one or multiple, but not all, receiving units can be at least partially provided by at least one winding structure of the inductive object detection system. Determination of the relative position and/or orientation based on the signal received by the at least one winding structure of the inductive object detection system can e.g. be performed for a near field positioning, e.g. if the secondary unit is arranged directly above the primary unit.

The inductive object detection system can comprise multiple detection and/or exciting winding structures, wherein these winding structures can be distributed, preferably evenly, across an active area assigned to the primary winding structure. The active area can denote an area covering the primary winding structure. The multiple detection and/or exciting winding structures can e.g. be arranged in an array-like structure.

It is possible that a scanning range of the first relative pose determining means is larger than a scanning range of the second relative pose determining means. Further, the scanning range of the first and/or the second relative pose determining means can (each) be different from the scanning range of the reference relative pose determining means.

In particular, the first relative pose determining means can have a scanning range with extends from 0 m to 6.5 m along a longitudinal axis of the primary-sided coordinate system, preferably from 0.45 m to 6.5 m. The second relative pose determining means can have a scanning range which is smaller than the scanning range of the first relative pose determining means. In particular, the scanning range of the second relative pose determining means can be limited to a volume above the primary winding structure or above the primary unit. The proposed system advantageously allows a robust and precise determination of a relative pose.

Further proposed a method for determining a relative pose between a primary winding structure and a secondary winding structure of a system for inductive power transfer.

The method can be performed by a system according to one of the embodiments described in this disclosure. Thus, the system is configured such that a method according to one of the embodiments described in this disclosure is performable by the system.

In particular, a relative pose is determined by a first pose determining means.

According to the invention, the pose determination by the first pose determining means is corrected, wherein a correction of the pose determination is adjusted before the pose determination. In particular, at least one parameter which is used for the correction of the pose determination or for the determination is adjusted before the pose determination. Further, it is possible that the correction is adjusted repeatedly, in particular repeatedly over a lifetime or runtime of the system.

The adjustment of the correction of the relative pose determination can also be referred to as calibration, in particular an online calibration of the system. It is thus possible to adapt the determination of the relative pose to changing environmental influences, wherein a desired accuracy is provided also for the changed influences.

In another embodiment, an uncorrected pose is determined, wherein a corrected pose is determined using at least one pose correction value. The pose correction value is adjusted before the pose determination of the corrected pose. It is also possible that the pose correction value is determined before the adjustment of the pose correction value.

Alternatively, a relative pose is determined using a parameterized pose determination function, wherein at least one parameter of the parameterized pose determination function is adjusted before the pose determination. Further, the at least one parameter can be determined before the adjustment. This and corresponding advantages have been explained before.

In another embodiment, a reference relative pose is determined, wherein the correction of the pose determination, e.g. at least one pose correction value or the at least one parameter of the pose determination function, is determined depending on the reference relative pose.

It is in particular possible that a vehicle pose is determined, wherein the reference relative pose is determined depending on the vehicle pose. It is further possible that a vehicle trajectory is determined, wherein the vehicle pose is determined depending on the trajectory information. In particular, a vehicle pose can be determined either iteratively, wherein a pose change is determined depending on trajectory information or at least one vehicle dynamic parameter. Further, a starting pose can be determined, wherein an actual pose can be determined as the sum of the starting pose and the determined pose changes.

In another embodiment, a reference relative pose is determined, wherein a resulting pose is determined depending on the reference relative pose and the relative pose determined by the first pose determining means. This and corresponding advantages have explained before.

The determination of a resulting pose can be an independent invention, in particular independent of the feature that the system comprises at least one correcting means for correcting the pose determination by the first pose determining means, wherein a correction of the pose determination is adjustable.

Thus, a system and a method for determining a (resulting) relative pose between a primary winding structure and a secondary winding structure of the system for inductive power transfer is described, wherein the system comprises at least a first pose determining means for determining a relative pose, wherein the relative pose is determinable by the first pose determining means, wherein the system further comprises at least one reference pose determining means for determining a reference relative pose, wherein a resulting pose is determinable depending on the reference relative pose and the relative pose determining by the first pose determining means. This and corresponding advantages have been explained before.

In another embodiment, at trajectory of the secondary winding structure and a trajectory of the pose determined by the first pose determining means is determined, wherein a coordinate transformation of the reference relative pose and of the relative pose determined by the first pose determining means into a common reference coordinate system is determined depending on the trajectory information. This and corresponding advantages have been explained before.

In another embodiment, a coordinate transformation of the reference relative pose and of the relative pose determined by the first pose determining means into a common reference coordinate system is determined as a preset coordinate transformation, if a charging pose is detected. It is further possible to use the pose of the secondary winding structure in the charging pose as a starting pose for the determination of following reference relative pose, to transform the starting pose into the common coordinate system, e.g. using the preset coordinate transformation and to determine the reference relative pose in the common coordinate system depending on the starting pose and the pose changes determined by the means for determining the reference relative pose, e.g. depending on the trajectory information.

It is in particular possible that one or more reference relative pose(s) is/are determined after the vehicle leaves the charging pose, wherein this reference pose or a set of multiple reference poses over time are determined depending on the starting pose and the pose changes relative to said starting pose. That the vehicle leaves the charging pose can e.g. be detected by detecting that the vehicle speed increases from 0 after a charging pose and a vehicle speed 0 have been detected.

BRIEF DESCRIPTION OF THE DRAWINGS

The invention will be described with reference to the attached figures. The figures show.

In the following, the same reference numerals denote the same or similar technical features.

DETAILED DESCRIPTION OF THE INVENTION

Figure 1:
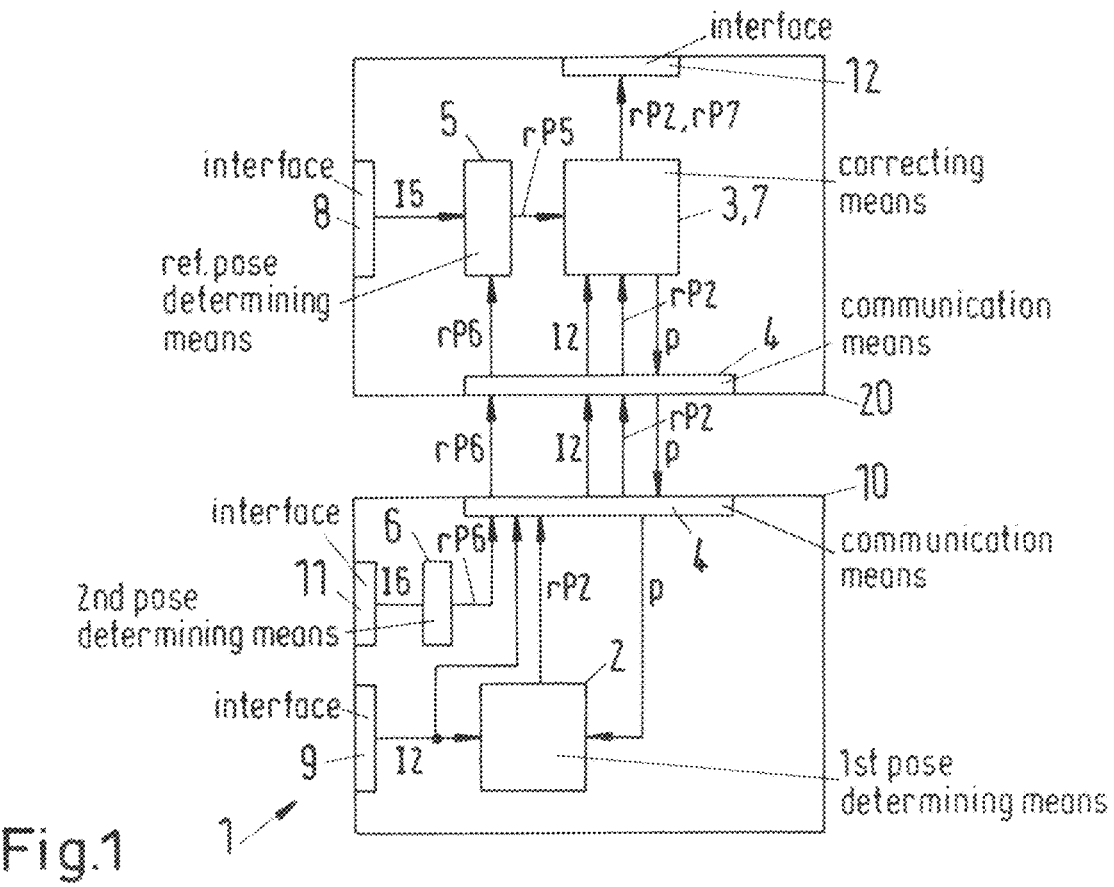
FIG. 1: a schematic block diagram of a system for determining a relative pose according to the invention.

FIG. 1 shows a system 1 for determining a relative pose rP2, rP7 between a primary winding structure and a secondary winding structure of a system for inductive power transfer. The system 1 comprises a first pose determining means 2, wherein the first pose determining means 2 is a primary-sided pose determining means. The first pose determining means 2 can determine a relative pose. The relative pose can e.g. be determined as the pose of the secondary winding structure in a coordinate system of the primary winding structure, i.e. a primary-sided and therefore immobile coordinate system.

Further, the system 1 comprises at least one correcting means 3, wherein the correcting means is a secondary-sided correcting means 3. By means of the correcting means 3, a correction of the pose determination can be performed. The correcting means 3 is a means for correcting the pose determination by the first pose determining means 2. In particular, the correction of the pose determination can be performed by determining at least one parameter p of a parameterized pose determination function. The parameter p is determined by the correcting means 3.

In FIG. 1, a primary unit 10 is indicated schematically a box. Correspondingly a secondary unit 20 is indicated by another box.

The first pose determining means 2 determines the relative pose rP2 using the parameterized pose determination function. At least one parameter of this parameterized pose determination function can be adjusted. In particular, an adjusted parameter p of this parameterized pose determination function can be determined by the correcting means 3, wherein the adjusted parameter p is transmitted via primary- and secondary-sided communication means 4 to the primary-sided first pose determining means 2. After adjusting or updating the at least one parameter p, the relative pose rP2 is determined by means of the updated pose determination function.

Further shown is a reference pose determining means 5, wherein the reference pose determining means 5 is secondary-sided pose determining means. By means of the reference pose determining means 5, a reference relative pose rP5 can be determined.

Further, the at least one parameter p of the pose determination function can be determined by means of the correcting means 3 depending on the reference relative pose rP5 and the relative pose rP2 determined by the first pose determining means 2.

Alternatively or in addition, the at least one parameter p of the pose determination function can be determined depending on the reference relative pose rP5 and an input I2 of the first pose determining means 2. An input I2 of the first pose determining means 2 can e.g. be provided by one or more input values. An input value can e.g. be provided by a signal characteristic of an output signal of a primary-sided receiving unit of a positioning signal which is transmitted by a secondary-sided transmitting unit.

It is e.g. possible that the correcting means 3 determines the at least one parameter p of the parameterized pose determination function such that a deviation between the reference relative pose rP5 and an output of the parameterized pose determination function is minimized, e.g. by an optimization method. The output can be determined by the correcting means 3 by evaluating the parameterized pose determination function given the input I2.

Further shown is a second means 6 for determining a relative pose. The second means 6 is a primary-sided means. Depending or the relative pose rP6 determined by the second means 6 for determining a relative pose, a charging pose can be detected. In the charging pose, the relative pose between the primary winding structure and the secondary winding structure of a system for inductive power transfer is within the predefined limits, e.g. limits derived from an allowed charging volume or area above the primary winding structure. In the charging pose, a desired, e.g. maximized, amount of power can be transferred, in particular with the best possible efficiency. The charging pose can e.g. be detected by the reference pose determining means 5.

It can assumed that in the charging pose, the determination of the relative pose by the first means 2 or the second means 6 for determining the relative pose is not or only minimally affected by environmental influences and thus a desire accuracy of the pose determination is provided.

The charging pose can provide a starting pose for determining the reference relative pose rP5, in particular the reference relative poses rP5 at points in time after the charging pose has been detected. It is e.g. possible that the reference pose determining means 5 can determine pose changes of the relative pose, in particular pose changes of the secondary winding structure, relative to said starting pose, wherein the reference pose rP5 is then determined as the sum of the starting pose and the reference pose rP5.

The reference relative pose rP5 or the pose changes of the relative pose can e.g. be determined by determining a vehicle trajectory after leaving the starting pose, wherein a trajectory of the secondary winding structure can be determined depending on the vehicle trajectory. Depending on the trajectory information, the pose changes and, using the starting pose, the reference relative poses rP5 along the trajectory can be determined.

It is thus in particular possible to determine the pose of the secondary winding structure in a primary-sided coordinate system depending on the input values I5 of the reference pose determining means 5, in particular if a starting pose is provided.

The reference pose determining means 5 can e.g. determine a vehicle pose or pose changes of the vehicle pose. The vehicle pose or the changes of the vehicle pose can be determined depending on input I5 of the reference pose determining means 5. At least one input value(s) of the input I5 can e.g. provided by a vehicle dynamic parameter, e.g. by a steering angle, a revolution per minute value of a vehicle wheel, a vehicle speed, a yaw rate of the vehicle, a longitudinal acceleration of the vehicle and or a lateral acceleration of the vehicle.

It is further possible that the system 1 comprises a means 7 for determining a resulting relative pose rP7. The resulting relative pose rP7 can e.g. be determined by a fusion of the reference relative pose rP5 and the relative pose rP2 determined by the first pose determining means 2.

Further shown is an interface 8 for the input I5 of the secondary unit 20. The interface 8 can e.g. provided by CAN interface. Further shown are interfaces 9, 11 of the primary unit 10, wherein the interface 9 is an interface for input signal I2 of the first pose determining means 2 and the interface 11 is an interface for input signals for the second pose determining means 6.

The interface 9 can e.g. provided by a primary-sided receiving unit or by multiple primary-sided receiving units. The interface 11 can be provided by further primary-sided receiving units or multiple primary-sided receiving units.

It is in particular possible that the input values I2 and the input values I6 are each provided by a received signal or at least one characteristic of the received signal, wherein the signal is transmitted by the secondary unit, e.g. by a secondary-sided transmitter (of not shown).

Further shown is an interface 12 of the secondary unit 20 to the vehicle, e.g. a CAN interface. By means of the interface 12, the relative position rP2 or the resulting relative position rP7 can be transmitted to the vehicle, in particular an infotainment system of the vehicle.

Figure 2:
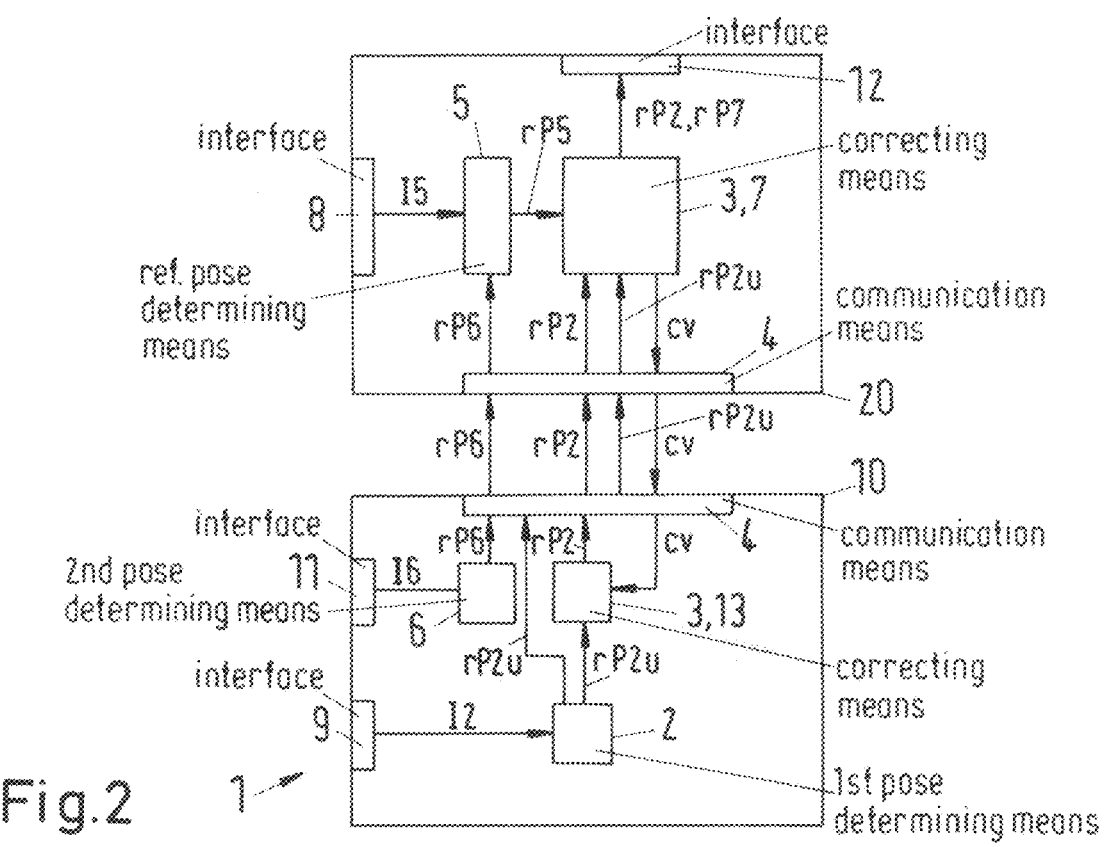
FIG. 2: a schematic block diagram of a system for determining a relative pose according to another embodiment

FIG. 2 shows a schematic block diagram of a system 1 according to another embodiment of the invention.

The embodiment shown in FIG. 2 is designed similar to the embodiment of the system 1 shown in FIG. 1. Thus, it is referred to the corresponding description of the embodiment shown in FIG. 1. In contrast to the embodiment shown in FIG. 1, the system 1 comprises a means 13 for correcting an uncorrected relative pose rP2u which is determined by the first pose determining means 2. In other words, the uncorrected relative rP2u is determined by the first pose determining means 2, wherein the uncorrected relative pose rP2u is corrected by the means 13, wherein the means 13 can be a primary-sided part of the correcting means 3. The correction is performed using at least one pose correction value cv. It is e.g. possible to add the at least one pose correction value or multiple pose corrections values to values representing the uncorrected relative pose rP2u. As a result, a correct relative pose rP2 is determined.

The at least one pose correction value cv can be determined by a secondary-sided correcting means 3 or a secondary-sided part of the correcting means 3. In particular, the at least one correction value cv can be determined such that a deviation between a reference relative pose rP5 and the corrected relative pose rP2 determined by the first pose determining means 2 is minimized. The primary-sided part of the correcting means 13 can e.g. comprise at least one storage means. Further, the means 13 can provide a database for multiple correction values. In this case, each of the pose correction values can be assigned to one uncorrected relative pose rP2u or to a set of uncorrected relative poses rP2u. It is then possible to determine the pose correction value cv depending on the uncorrected pose rP2u from the database.

Figure 3:
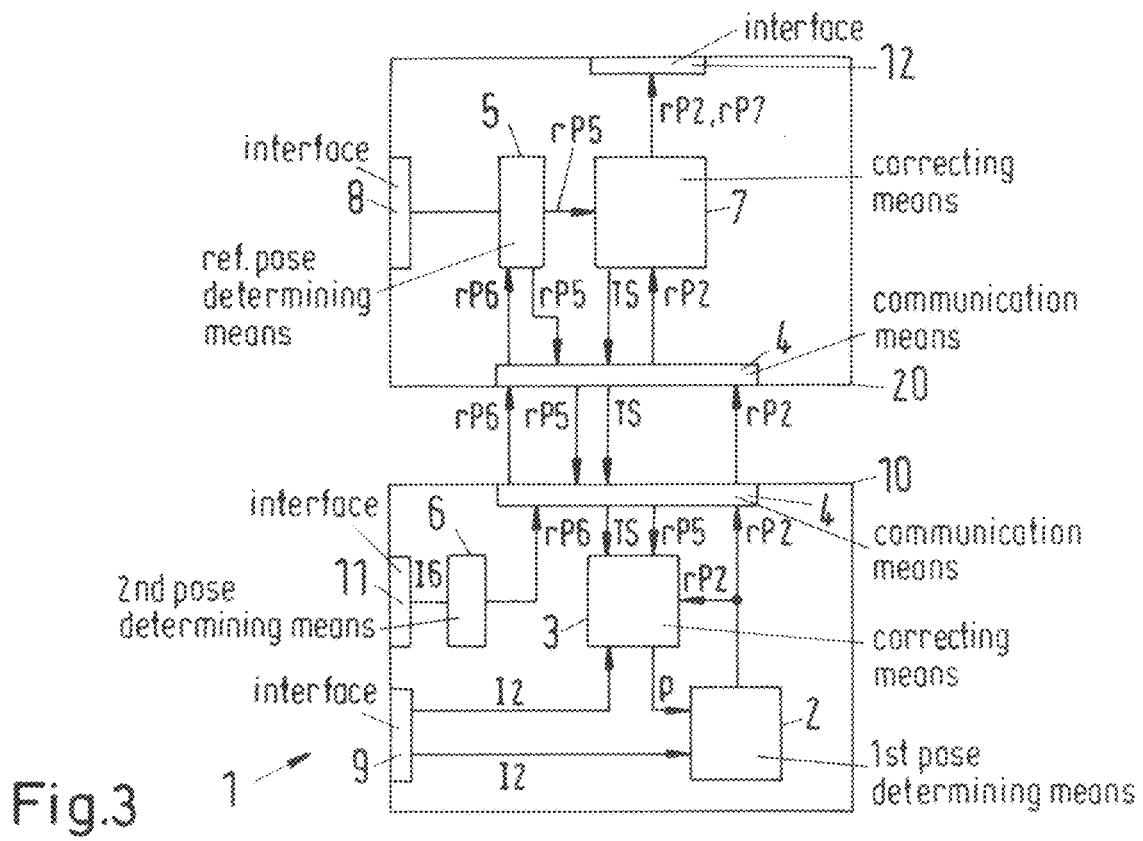
FIG. 3: a schematic block diagram of a system for determining a relative pose according to another embodiment.

FIG. 3 shows a schematic block diagram of the system 1 according to another embodiment of the invention.

In contrast to the embodiment shown in FIG. 1, the correcting means 3 is a primary-sided correcting means 3. In this embodiment, the reference relative position rP5 determined by a reference determining means 5 is transmitted via the primary- and secondary-sided communication means 4 to the primary-sided correcting means 3. The primary-sided correcting means 3 determines a parameter p of the parameterized pose determination function as outlined before, in particular with reference to description of the embodiment shown in FIG. 1.

Further shown is that the resulting pose determining means 7 can generate a trigger signal TS for updating the at least one parameter p of the parameterized pose determination function. The trigger signal TS can e.g. be generated if a deviation between the relative pose rP2 determined by the first pose determining means 2 and the reference relative rP5 is higher than a predetermined threshold value or if a time course of relative poses rP2 (which can correspond to a trajectory of relative poses or the secondary winding structure) deviates more than a predetermined amount from a corresponding time course of reference relative poses rP5.

Figure 4:
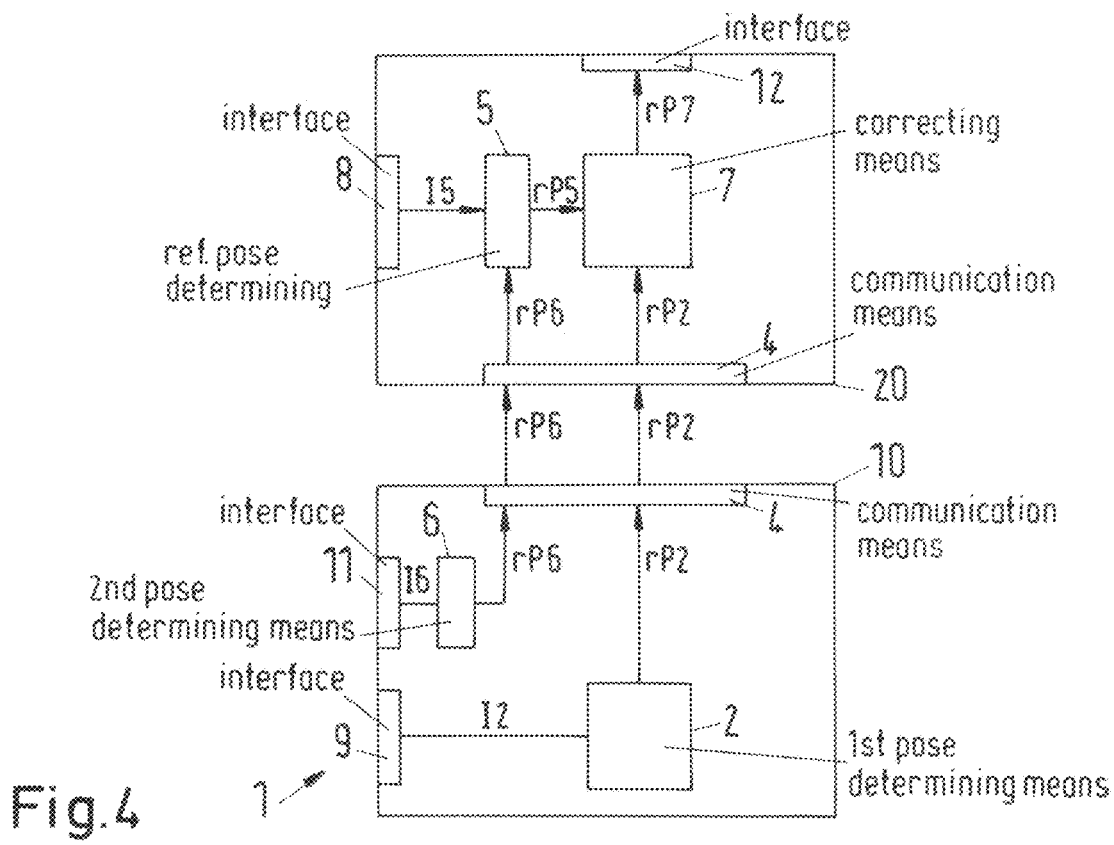
FIG. 4: a system for determining a relative pose according to another embodiment of the invention.

FIG. 4 shows a schematic block diagram of a system 1 according to another embodiment of the invention. In contrast to the embodiment shown in FIG. 1, the system 1 comprises no correcting means 3 for correcting the pose determination. In particular, the system comprises a resulting pose determining means 7, wherein the resulting pose determining means determines a resulting pose rP7 depending on the reference relative pose rP5 and the relative pose rP2 determined by the first pose determining means 2.

By means of the interface 12, the information on the relative pose rP2 or the resulting relative pose rP7 can be transmitted to an infotainment system of the vehicle and e.g. be displayed on a vehicle display to the driver.

Figure 5:
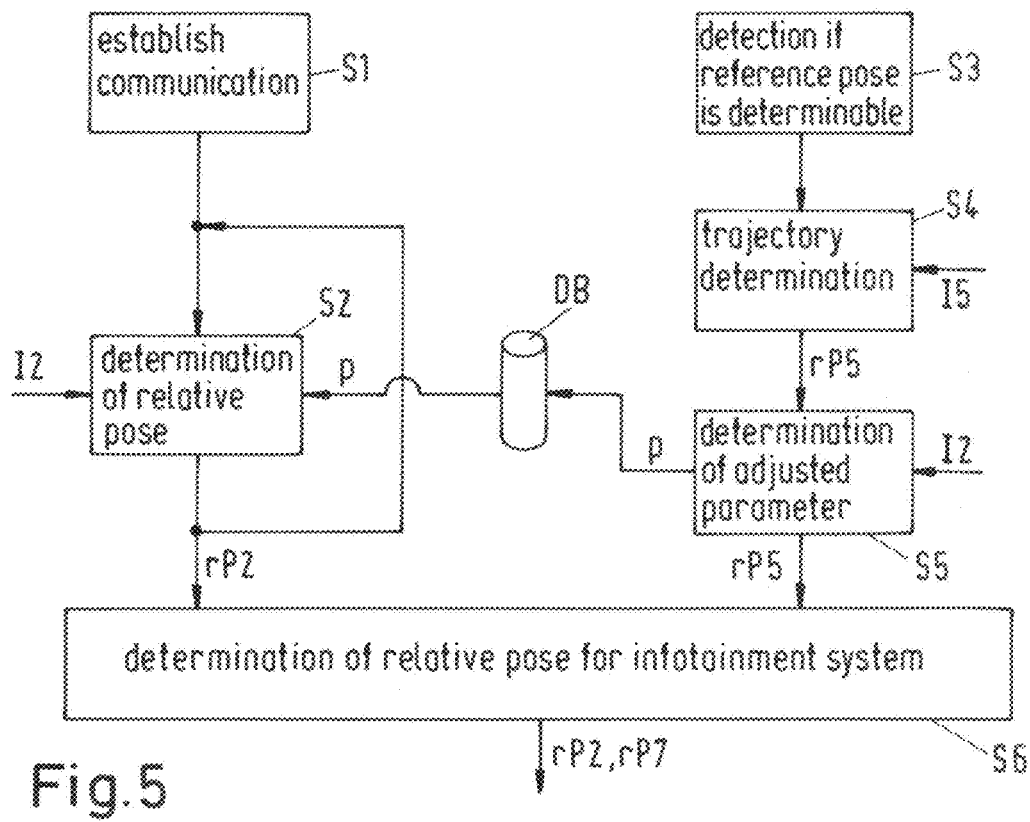
FIG. 5: a schematic flow diagram of a method according to the invention.

FIG. 5 shows a schematic flow diagram of a proposed method. In a first step S1, a communication between the primary unit 10 and the secondary unit 20 (see e.g. FIG. 1) is established, e.g. via a so called Bluetooth handshake. Then, pose determination by a first pose determining means 2 (see e.g. FIG. 1) is activated.

In a second step S2, the relative pose rP2 is determined by first pose determining means 2. The relative pose rP2 can e.g. determined by a parameterized pose determination function and depending on an input I2 to said function. Parameters of the pose determination function can e.g. be retrieved from a database DB In a first alternative, at least one parameter of the parameterized pose determination function is an adjustable parameter.

In this case, in a third step S3, it is detected if a reference relative pose rP5 can be determined. It is e.g. possible that it is detected if the vehicle or the secondary winding structure is arranged in a charging pose. Said charging pose can then be used as a starting pose of a trajectory of the secondary winding structure after the vehicle (and thus the secondary winding structure) leaves the charging pose. Further, in the third step S3, it can be detected if the vehicle leaves the charging pose.

After the vehicle leaves the charging pose, a trajectory of the secondary winding structure, i.e. pose changes, of the secondary winding structure can be determined depending on an input I5, e.g. a vehicle dynamic parameter and, if necessary, time information in the fourth step S4. Depending on the pose changes and the starting pose, a pose of the secondary winding structure can be determined as reference relative pose rP5 in the fourth step S4.

It is possible that a spatial relation of the pose of secondary winding structure relative to the common coordinate system is known or is determinable in the charging pose, e.g. corresponds to a preset coordinate transformation. Thus, the pose after a pose change based on a vehicle movement can also be reliably determined in the common coordinate system.

In a fifth step S5, an adjusted parameter p is determined and the database DB for providing the parameter p used in the second step S2 is updated. The updated parameter p of the pose determination function can e.g. be determined depending on the reference relative pose rP7 (see FIG. 1) and input signals I2 of the first pose determining means 2. In particular, the parameter p can be determined such that a deviation between an output pose of the pose determination function which is determined based on the input value I2 and the reference relative pose rP7 is minimized.

It is further possible to determine the relative pose which is provided to the infotainment system of the vehicle as the relative pose rP2 determined by the first pose determining means 2 or as a resulting pose rP7 which can be determined by resulting pose determining means 7 (see FIG. 1) in a sixth step S6.

It is important to notice that the numbering of the steps does not define a fixed sequence. It is in particular possible that the second step S2 is performed repeatedly before the third step S3 is performed, in particular as long as the vehicle and thus the secondary winding structure approaches the primary unit 10.

It is further possible to perform the fourth step S4 repeatedly after the vehicle (and thus the secondary winding structure) leaves a charging pose. Further, the second step S2 can also be performed at least partially simultaneously to the fourth step S4.

Figure 6:
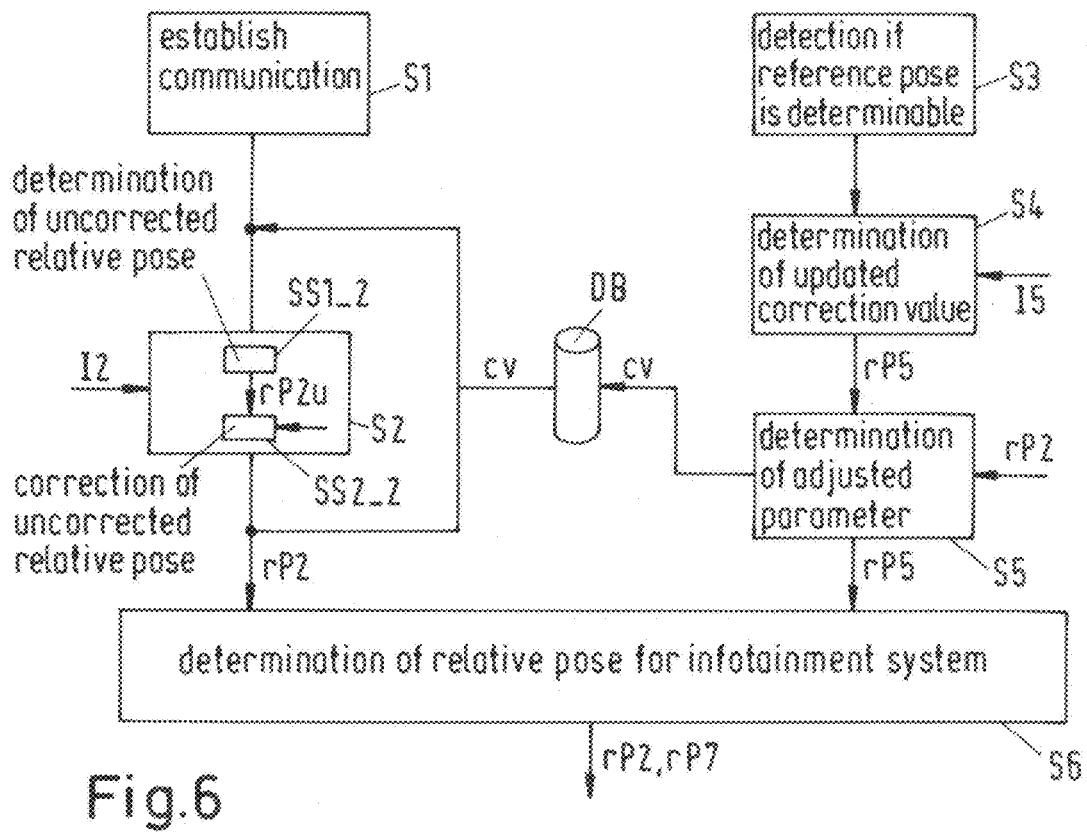
FIG. 6: a schematic flow diagram of a method according to another embodiment of the invention.

FIG. 6 shows a schematic flow diagram of a method according to another embodiment of the invention. In contrast to the embodiment shown in FIG. 5, the second step S2 comprises to sub steps SS1_2, SS2_2. In the first sub step SS1_2, an uncorrected relative pose rP2u is determined by the first pose determining means 2 (see FIG. 2). In a second sub step SS2_2, the uncorrected relative rP2u is corrected using a correction value cv. The correction value cv can be retrieved from a database DB.

In the fourth step S4, an updated correction value cv is determined such that a deviation between the relative pose rP2 determined in the second step S2 and the reference relative pose rP5 (see FIG. 2) determined in the fourth step S4 is minimized. Subsequently, the database DB providing the correction value cv is updated and used for subsequent performance of the second step S2.

The invention claimed is:

1. A method for determining a relative pose between a primary winding structure and a secondary winding structure of a system for inductive power transfer comprising:
   receiving, with at least one processor, data associated with a signal, wherein the data associated with the signal comprises a signal characteristic of the signal, the signal characteristic comprises an electrical characteristic that indicates a relationship between a primary winding structure and a secondary winding structure;
   determining, with the at least one processor, a relative pose between the primary winding structure and the secondary winding structure based on the signal characteristic of the signal, wherein the relative pose denotes at least one of (a) a difference in position and (b) a difference in orientation between the primary winding structure and the secondary winding structure in a coordinate system, wherein determining the relative pose comprises:
      determining the relative pose based on a function that comprises one or more adjustable parameters, wherein the one or more adjustable parameters are based on environmental influences of the system for inductive power transfer that includes the primary winding structure and the secondary winding structure; and
   outputting, with the at least one processor, the relative pose.

2. The method of claim 1, wherein the coordinate system is a common coordinate system provided by a secondary-side coordinate system associated with the secondary winding structure, and wherein the relative pose denotes at least one of (a) the difference in position and (b) the difference in orientation between the primary winding structure and the secondary winding structure in the common coordinate system.

3. The method of claim 1, wherein the coordinate system is a common coordinate system provided by a primary-sided coordinate system associated with the primary winding structure, and wherein the relative pose denotes at least one of (a) the difference in position and (b) the difference in orientation between the primary winding structure and the secondary winding structure in the common coordinate system.

4. The method of claim 1, wherein receiving the data associated with the signal comprises:
   receiving the data associated with the signal from a device associated with the secondary winding structure.

5. The method of claim 1, further comprising:
   determining a trajectory of a vehicle associated with the relative pose based on determining the relative pose between the primary winding structure and the secondary winding structure.

6. The method of claim 5, wherein determining the trajectory of the vehicle associated with the relative pose comprises:
   determining a change of the relative pose between successive values of relative poses in a set of values of relative poses along a path of the vehicle.

7. The method of claim 1, further comprising:
   transmitting information associated with the relative pose for display on a display device of a vehicle.

8. A system for determining a relative pose between a primary winding structure and a secondary winding structure of a system for inductive power transfer comprising:
   at least one processor programmed or configured to:
      receive data associated with a signal, wherein the data associated with the signal comprises a signal characteristic of the signal, the signal characteristic comprises an electrical characteristic that indicates a relationship between a primary winding structure and a secondary winding structure;
      determine a relative pose between the primary winding structure and the secondary winding structure based on the signal characteristic of the signal, wherein the relative pose denotes at least one of (a) a difference in position and (b) a difference in orientation between the primary winding structure and the secondary winding structure in a coordinate system, wherein, when determining the relative pose, the at least one processor is programmed or configured to:
         determine the relative pose based on a function that comprises one or more adjustable parameters, wherein the one or more adjustable parameters are based on environmental influences of the system for inductive power transfer that includes the primary winding structure and the secondary winding structure; and
      output the relative pose.

9. The system of claim 8, wherein the coordinate system is a common coordinate system provided by a secondary-side coordinate system associated with the secondary winding structure, and wherein the relative pose denotes at least one of (a) the difference in position and (b) the difference in orientation between the primary winding structure and the secondary winding structure in the common coordinate system.

10. The system of claim 8, wherein the coordinate system is a common coordinate system provided by a primary-sided coordinate system associated with the primary winding structure, and wherein the relative pose denotes at least one of (a) the difference in position and (b) the difference in orientation between the primary winding structure and the secondary winding structure in the common coordinate system.

11. The system of claim 8, wherein, when receiving the data associated with the signal, the at least one processor is programmed or configured to:
   receive the data associated with the signal from a device associated with the secondary winding structure.

12. The system of claim 8, wherein the at least one processor is further programmed or configured to:
   determine a trajectory of a vehicle associated with the relative pose based on determining the relative pose between the primary winding structure and the secondary winding structure.

13. The system of claim 12, wherein, when determining the trajectory of the vehicle associated with the relative pose, the at least one processor is programmed or configured to:
   determine a change of the relative pose between successive values of relative poses in a set of values of relative poses along a path of the vehicle.

14. The system of claim 8, wherein the at least one processor is further programmed or configured to:
   transmit information associated with the relative pose for display on a display device of a vehicle.

15. A method for determining a relative pose between a primary winding structure and a secondary winding structure of a system for inductive power transfer comprising:
   receiving, with at least one processor, data associated with a signal, wherein the signal comprises a signal characteristic, the signal characteristic comprises an electrical characteristic that indicates a relationship between a primary winding structure and a secondary winding structure;
   determining, with the at least one processor, an uncorrected relative pose between the primary winding structure and the secondary winding structure based on the signal characteristic of the signal received, wherein the uncorrected relative pose denoting at least one of (a) a difference in position and (b) a difference in orientation between the primary winding structure and the secondary winding structure in a common coordinate system;
   determining, with the at least one processor, a corrected relative pose based on the uncorrected relative pose and at least one adjustable correction value, wherein the at least one adjustable correction value is based on environmental influences of a system for inductive power transfer that includes the primary winding structure and the secondary winding structure; and
   outputting, with the at least one processor, the corrected relative pose.

16. The method of claim 15, wherein the at least one processor is further programmed or configured to:
   determining a trajectory of a vehicle associated with the relative pose based on determining the relative pose between the primary winding structure and the secondary winding structure.

17. The method of claim 16, wherein determining the trajectory of the vehicle associated with the relative pose comprises:
   determining a change of the relative pose between successive values of relative poses in a set of values of relative poses along a path of the vehicle.

18. A system for determining a relative pose between a primary winding structure and a secondary winding structure of a system for inductive power transfer comprising:
   at least one processor programmed or configured to:
      receive data associated with a signal, wherein the signal comprises a signal characteristic, the signal characteristic comprises an electrical characteristic that indicates a relationship between a primary winding structure and a secondary winding structure;
      determine an uncorrected relative pose between the primary winding structure and the secondary winding structure based on the signal characteristic of the signal received, wherein the uncorrected relative pose denoting at least one of (a) a difference in position and (b) a difference in orientation between the primary winding structure and the secondary winding structure in a common coordinate system;
      determine a corrected relative pose based on the uncorrected relative pose and at least one adjustable correction value, wherein the at least one adjustable correction value is based on environmental influences of a system for inductive power transfer that includes the primary winding structure and the secondary winding structure;
   outputting, with the at least one processor, the corrected relative pose.

19. The system of claim 18, wherein the at least one processor is further programmed or configured to:
   determine a trajectory of a vehicle associated with the relative pose based on determining the relative pose between the primary winding structure and the secondary winding structure.

20. The system of claim 19, wherein determining the trajectory of the vehicle associated with the relative pose comprises:
   determine a change of the relative pose between successive values of relative poses in a set of values of relative poses along a path of the vehicle.

* * * * *